A. M. GRUBBS.
HANDLE ATTACHMENT.
APPLICATION FILED JUNE 28, 1918
Reissued Nov. 26, 1918. 14,554.
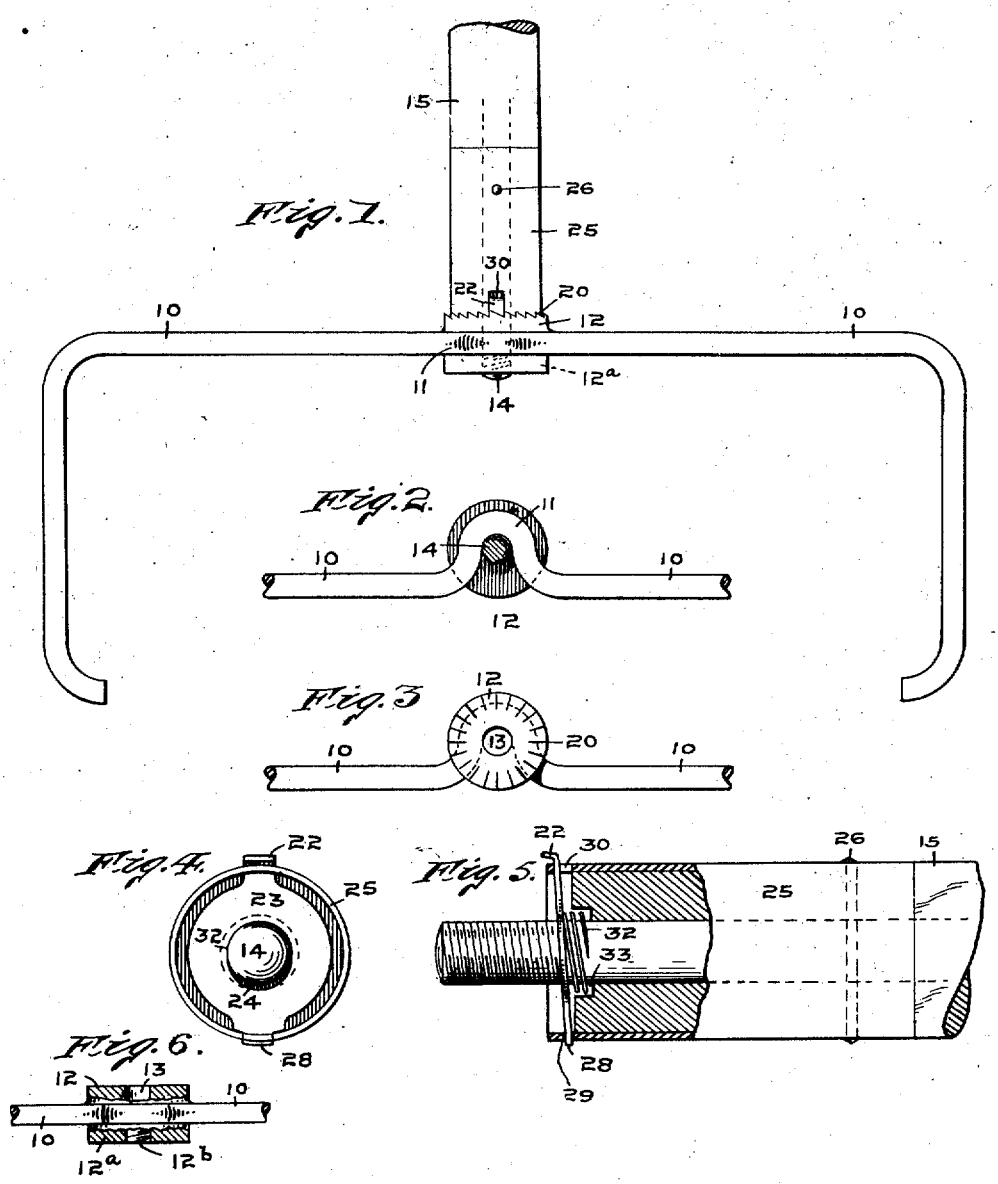
INVENTOR
Albert M. Grubbs,
By Minturn & Woerner,
ATTORNEYS.

UNITED STATES PATENT OFFICE.

ALBERT M. GRUBBS, OF WARSAW, INDIANA.

HANDLE ATTACHMENT.

14,554. Specification of Reissued Letters Patent. Reissued Nov. 26, 1918.

Original No. 1,254,686, dated January 29, 1918, Serial No. 189,917, filed September 6, 1917. Application for reissue filed June 28, 1918. Serial No. 242,497.

*To all whom it may concern:*

Be it known that I, ALBERT M. GRUBBS, a citizen of the United States, residing at Warsaw, in the county of Kosciusko and State of Indiana, have invented certain new and useful Improvements in Handle Attachments, of which the following is a specification.

This invention relates to a device for detachably securing a handle to the bails of certain classes of vacuum cleaners and carpet sweepers and the like, wherein the ordinary handle has a tendency to unscrew and become loose, and which is induced through the reciprocatory movement imparted to such cleaners and sweepers when in use; and one of the objects of the invention consists in the provision of a handle-attachment whereby a handle can be securely attached or detached from a vacuum cleaner and carpet sweeper bail, thereby preventing accidental separation of the parts.

A further object of the invention consists in the provision of a handle-attachment which is simple in construction, efficient in operation and economical to manufacture.

I accomplish the above objects of the invention, and such others as may appear from a perusal of the specification and claims, by means of the construction illustrated in the accompanying drawings, forming a part hereof, in which—

Figure 1 is a top or plan view of a portion of a handle and bail, showing my invention in operative position. Fig. 2 is a fragmentary detail in front elevation of the construction shown in Fig. 1, with the outer disk omitted. Fig. 3 is a rear elevation of the opposite side of the construction from that shown in Fig. 2. Fig. 4 is an end elevation of the handle, on an enlarged scale, in which the bail is omitted. Fig. 5 is a fragmentary detail partly in section and partly in elevation of the construction shown in Fig. 4. Fig. 6 is a modified construction.

Referring to the drawings, 10 represents a bail such as employed on certain vacuum cleaners and carpet sweepers, and said bail is provided with a bend 11 midway its length. Integrally formed as a part of bail 10, or securely attached thereto, is a disk 12 having a central aperture 13 adapted to form a passageway for a threaded bolt 14 mounted in the end of a handle 15. Bail 10 may be formed with a single disk 12 on one of its sides, or the bail may be formed with a second disk $12^a$, as shown in Figs. 1 and 6. Disk 12 may have a smooth inner face, as shown in Fig. 6, or it may be provided with ratchet teeth 20, as shown in Fig. 1. In case disk 12 alone is formed on bail 10 its central aperture 13 is provided with threads adapted to engage the threaded end of bolt 14. When however the additional disk $12^a$ is employed aperture 13 is left free of threads and aperture $12^b$ in disk $12^a$ is provided with threads, thereby providing a bearing nearer the end of bolt 14. In case disk 12 is provided with the ratchet teeth 20 the said teeth are engaged by a pawl 22 carried in the end of handle 15. The end of handle 15 is provided with a ferrule 25, and a pin 26 is passed transversely through said ferrule, handle 15 and bolt 14 to firmly hold the several parts in rigid relation. Ferrule 25 projects slightly in advance of the end of handle 15 to form a recess for housing body 23 carrying pawl 22, and body 23 is provided with a central aperture 24 for the passage of bolt 14. One end of body 23 terminates in an ear 28 which enters a slot 29 in ferrule 25 and forms a pivot for tilting body 23 and swinging pawl 22 into and out of engagement with the ratchet teeth 20 in the face of disk 12, and an elongated slot 30 in ferrule 25 permits free movement of pawl 22 within prescribed limits. Pawl 22 is normally held into engagement with teeth 20 through the medium of a spring 32 surrounding bolt 14 and bearing against the adjacent face of body 23. In view of the limited space between body 23 and the end of handle 15 the latter is provided with a socket 33 for the reception of said spring 32.

While I have described my invention with more or less minuteness as regards details of construction and arrangement, and as being embodied in certain precise forms, I do not desire to be limited thereto unduly or any more than is pointed out in the claims. On the contrary, I contemplate all proper changes in form, construction and arrangement, the omission of immaterial elements, and the substitution of equivalents as circumstances may suggest or necessity render expedient.

I claim:

1. In combination, a bail having a U-shaped bend, a threaded aperture disk firmly secured to said U-shaped bend, a handle, and a threaded bolt carried by said handle for engaging the threaded aperture in said disk.

2. In combination, a bail having a U-shaped bend forming a passageway for a threaded bolt, a threaded disk rigidly secured to said U-shaped bend with the threaded aperture in registration with said passageway in the U-shaped bend, a handle, and a threaded bolt carried by said handle and adapted to engage the threaded aperture in the disk and projecting through the passageway in the U-shaped bend.

3. In combination, a bail having a pair of fixed disks provided with alined apertures and one of said apertures having threads, a handle, and a threaded bolt carried by said handle and adapted to pass through one disk and engage the threads in the other disk.

4. In combination, a bail having a pair of fixed disks provided with alined apertures, teeth on one disk, a handle, a threaded bolt carried by said handle, said bolt adapted to pass through one disk and engage the threaded aperture in the other disk, and means carried by said handle for engaging the teeth on the disk and preventing accidental separation of the parts.

5. In combination, a bail having a pair of fixed disks provided with alined apertures, teeth on one disk, a handle, a threaded bolt carried by said handle, said bolt adapted to pass through one disk and engage the threaded aperture in the other disk, and means carried by said handle for yieldingly engaging the teeth on the disk and preventing accidental separation of the parts.

6. In combination, a bail having a pair of fixed disks provided with alined apertures, teeth carried on one disk, a handle, a threaded bolt carried by said handle, said bolt adapted to pass through one disk and engage the threaded aperture in the other disk, a pawl carried by said handle for engaging the teeth on the disk, and means for holding said pawl normally into engagement with said teeth.

7. In combination, a bail having a pair of fixed disks provided with alined apertures, teeth on one disk, a handle, means on said handle adapted to pass through one disk and engage the other disk, and means carried by said handle for engaging the teeth on the disk and for preventing accidental separation of the parts.

In witness whereof, I have hereunto set my hand at Warsaw, Indiana, this 25 day of June, A. D., one thousand nine hundred and eighteen.

ALBERT M. GRUBBS.

Witnesses:
ALLAN S. WIDAMAN
LOU H. HAYMOND.